United States Patent [19]

Stuckey

[11] Patent Number: 4,519,162

[45] Date of Patent: May 28, 1985

[54] VERTICAL PLANT SUPPORT WITH HORIZONTAL HOOPS

[76] Inventor: William C. Stuckey, 1503 Virginia St. E., Charleston, W. Va. 25311

[21] Appl. No.: 519,658

[22] Filed: Aug. 2, 1983

[51] Int. Cl.³ ............................................. A01G 9/12
[52] U.S. Cl. ...................................................... 47/47
[58] Field of Search ..................................... 47/44–47, 47/70; 256/23, 34, 47–58, 68; 248/220.4, 221.2, 222.1

[56] References Cited

U.S. PATENT DOCUMENTS

| | | | |
|---|---|---|---|
| 1,516,179 | 11/1924 | Ferris | 256/54 |
| 1,587,740 | 6/1926 | Wiswell | 47/47 |
| 1,627,495 | 5/1927 | Effley | 47/47 |
| 2,631,804 | 3/1956 | Uhlhorn | 248/221.2 X |
| 3,018,898 | 1/1962 | Frazelle | 248/221.2 X |

Primary Examiner—Richard T. Stouffer
Assistant Examiner—Danton D. DeMille
Attorney, Agent, or Firm—Jim Zegeer

[57] ABSTRACT

A plant/vine support comprises a post or stake member adapted to be driven into the earth spaced a distance away from the plant or vine and a plurality of rings, each ring having integrally formed stabilizing members for stabilizing the rings in vertical and horizontal planes and connectors for detachably securing the rings to the post or stake. In one embodiment, pairs of holes in the channel post receives pairs of locking hooks and, in another embodiment, one of the locking hooks is a locking detent. Both embodiments are low in cost and can be easily manufactured. The component parts in both embodiments have relatively flat dimensions and can be transported easily, and they are easily assembled and disassembled and stored and various size rings, frames or hoops may be utilized in various combinations on a common post.

4 Claims, 7 Drawing Figures

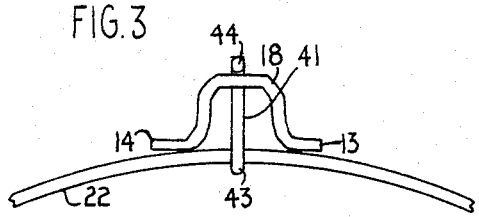
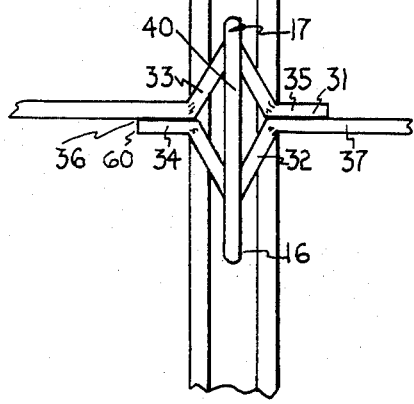
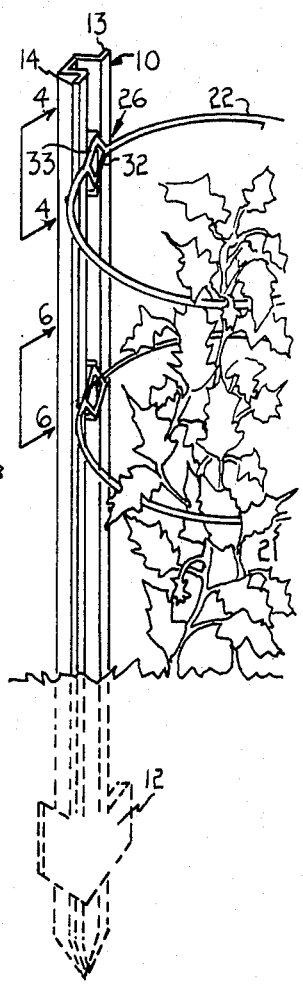

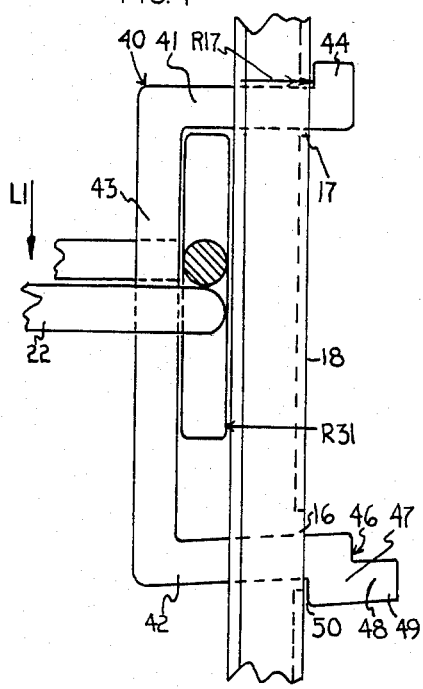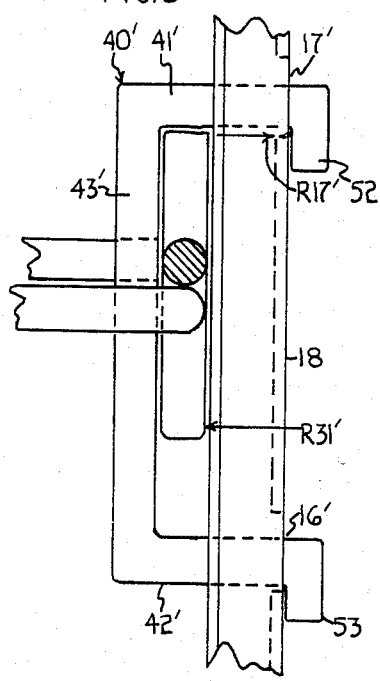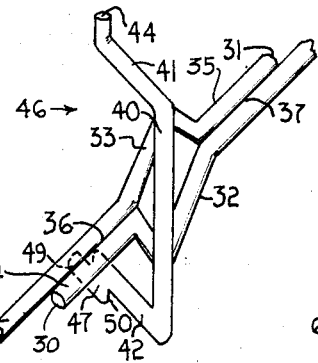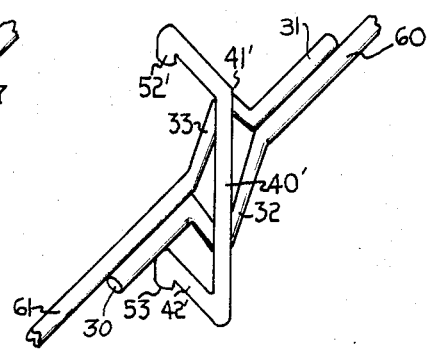

VERTICAL PLANT SUPPORT WITH HORIZONTAL HOOPS

BACKGROUND OF THE INVENTION

The present invention is directed to improved plant/vine support of the type wherein a post is driven into the ground and the plant supports are cantelever supported from the stake or post. There have been a number of efforts in the past to provide such plant/vine suppost. In Orthman U.S. Pat. No. 3,731,429, a plurality of ring assemblies are provided each ring assembly having a plurality of rings of different diameters secured in frustoconical shape and a "T" shaped post is utilized with shoulders on the post cooperating with holes on a bracket secured to the ring assemblies so as to support the ring assemblies in cantelever fashion from the cross of the "T" shaped post. While adequate support is provided by this type of assembly, it is complex and the rings cannot be easily stacked or shipped and can interengage, entangle and lock with one another making use a time consuming problem. In Barnhart U.S. Pat. No. 2,152,018 a stake or post has a pair of stuck out prongs or fingers which engage in annular ring which has a pair of inwardly projecting prongs so as to butt against the standard member of the post. In Peterson U.S. Pat. No. 2,851,823, an adjustable plant support is disclosed wherein a circular post has a friction locking element thereon and an opening or slot in the locking element into which downwardly projecting loop on the annular ring is inserted to provide an adjustable support. In Worthington U.S. Pat. No. 2,764,846, a post is disclosed as having pivoted thereon annular rings which have a downwardly projecting hoop member which serves as a stop for each ring. In Effley's U.S. Pat. No. 1,627,495, the annular loop or ring has a downwardly projecting arm which has a prong formed at the and thereof which is inserted into one of a plurality of holes in the post to provide for height adjustment. Stanley's U.S. Pat. No. 1,627,803, discloses a ring with a screw clamp for adjustably positioning the ring on the post.

The present invention utilizes a standard, low cost, U shaped steel fence post and cantelever plant/vine support rings or hoops having outwardly projecting support prongs which engage holes in the base of the U of the post. The ends of the rings or hoops are shaped so as to provide vertical bracing and support for the ring when it is loaded with plant growth. The hoops can be rigid steel wire such as ⅛ to a quarter inch steel gauge wire or can be aluminum or high strength plastic. The hoops can be galvanized steel or zinc or plastic coated to protect from chemicals put on plants such as tomatoes. For tomatoes, the post should be about five feet and for bean poles, the post should be about eight feet for a six foot bean pole. Advantages of the invention are that it does support the tomatoes as does prior art plants but in a more efficient and expeditious way. As is known, 20 to 25 percent more tomatoes can be grown with the wire hoop method. This invention is relatively inexpensive, is easier to manufacture, requires less metal working, is easy to assemble and disassemble, ship and store and it permits commercial growers to use tomatoe stakes. Plant/vine supports according to the invention are versatile. There can be small rings, large rings, and various combinations or rings on a common post. The post will stay in the ground better and withstand wind loading better. Standard cages have to be staked. Cucumbers, squash, certain varieties of grapes and fruit trees (dwarf fruit such as apples) which have no significant root system can be supported on six foot centers. Blueberries are fruiting vines as are raspberries and blackberries, all of which can be supported using the plant/vine support of the present invention.

BRIEF DESCRIPTION OF THE DRAWINGS

The above and other objects, advantages and features of the invention will become more apparent when considered with the following specifications and accompanying drawings wherein:

FIG. 1 is an isometric view of a plant/vine support incorporating the invention, FIG. 2 is a front elevational view showing the connection of the plant support members per se to the post, FIG. 3 is a top view thereof, FIG. 4 is a side elevational view of a first embodiment of the invention, FIG. 5 is an isometric view of the post attachment and vertical and horizontal stabilizing assembly, FIG. 6 is a side elevational view of a second embodiment of the invention, and FIG. 7 is a further isometric view of the modification shown in FIG. 6 of the post attachment and vertical and horizontal stabilizing assembly.

DETAILED DESCRIPTION OF THE INVENTION

The plant/vine supporting device of this invention includes a U-shaped post or stake 10 adapted to be driven into the ground and which may or may not have welded thereto conventional underground plate 12. Post 10 is a standard U shaped fence post having short lateral flange members 13 and 14.

A series of spaced apart hole pairs 16–17 is formed in the base 18 of the U-shape of the post 10. In the embodiment shown in FIGS. 2, 3 and 4, the upper holes 17 in base 18 of post 10 are circular but they may be oblong or elongated and the lower holes or aperture 16 are oblong or elongated as shown in FIG. 2.

A plurality of plant/vine supporting wire rings or hoops 21–22 may be selectively positioned on the post at different locations utilizing the holes or apertures 16 and 17 in the base 18 of post 10. Hoops 21 and 22 have integrally formed therewith post attachment and vertical and horizontal stabilization assemblies 26 and 27 respectively.

Two embodiments of the attachment and vertical and horizontal stabilization assemblies are disclosed herein, mounting assembly 26 which is shown in detail in FIGS. 4 and 5 and mounting assembly 27 which is shown in detail in FIGS. 6 and 7.

Each of the rings or hoops 21–22 is formed in the shape of a circle but it will be appreciated that they need not be circular and may have ends straight as is illustrated in the embodiment shown in FIG. 7 where the ends do not meet and/or they may have the ends formed with hooks which interengage and hook one another. Referring now to FIG. 2, the ends 30–31 of each of the rings or hoops have V-shaped brace members 32–33 formed therein with the straight terminal ends 34–35 welded as at 36–37 to the lower and upper surfaces respectively, of the contiguous surfaces of the hoop or ring proper. A U-shaped peg or prong member 40 is welded to the lower and upper brace structures 32 and 33 and has a pair of projecting prongs 41–42 and a base member 43. Prong member 41 in this embodiment has an upstanding hook portion 44 which passes through hole 17 and engages the upper portion of the surfaces bounding on the upper edge of hole 17 so as to provide a positive locking of prong 41 in hole 17. The lower prong 42 is spaced somewhat below the lower portion of the V brace 32 to provide spring action. The end 46 has a first bend 47 and then a straight portion 48. The prong 42 is slightly canted relative to the horizontal so that the lower edge 49 of projection 48 will engage the forward or inward edge of hole 16. Thus, in this embodiment, when short locking abuttment 44 on prong 41 is passed through the hole 17, the entire assembly pivots thereabout so that the surface 49 engages the edge on hole 16 and cams prong 42 upwardly against the spring action of the metal. When the edge 50 passes the rearmost surface of the hole 16 in base 18, it springs down to securely lock the hoop in position.

The lower brace 32 coacts with hook portion 44 to stabilize the hoop against all significant vertical and horizontal loading and assures that the hoop will stay substantially parallel (apart from bending) during normal use. In this regard, it will be noted that when a load indicated by the downward arrow L1 is on the ring or hoop 22, there is an opposing reaction force R17 at the upper surface of the wall 18 bounding hole 17 and a further reaction force R32 bearing on the two legs of the brace from the outer surfaces of flanges 13 and 14, respectively. The welding of the base 43 of the prong assembly to the pieces of the V-shaped braces 32 and 33 provides this stability. As noted above in the embodiment shown in FIG. 4, the lower prong 42 is spaced slightly below the apex of the lower V brace 32 to allow for spring action in the prong 42 as well as the adjacent portion of the base 43 of this member.

It will be noted that the arm 49 projects outwardly from the base 18. This provides a projection which can be easily engaged by the finger to lift the butting shoulder or ledge 50 over the edge or the bottom of the hole 16 so as to permit the easy disassembly of the post from the hoop or ring. Moreover, these ring assemblies are very short in depth and large numbers of the rings and posts can be conveyed in a pick-up truck, for example.

In the embodiment shown in FIGS. 6 and 7, the holes 16' and 17' in the base 18' of the U shaped post member 10' are oval or oblong. The reason for this is that in this embodiment the peg or prong member 43' and its two projecting prongs 41' and 42' are provided with downwardly projecting lugs or hook assemblies 52 and 53, respectively. While hook 53 can be of relatively short length, hook element 52 is long enough that it projects downwardly so as to avoid disengagement of the hook 52 and prong 41' from hole 17'. In this case, the reaction force R17' bears against the depending hook portion 52. The reaction force R31' acts in essentailly the same way as described earlier in connection with the embodiment shown in FIG. 4.

In the embodiment shown in FIG. 7, instead of a circular annular ring constituting the plant engaging portions of the support, the wire of the plant support 60-61 are two straight members.

As noted earlier, the present invention may be used for supporting plants and vines of all kinds but is particularly useful for tomato vines and with the quarter inch wire rings, upwards of 100 pounds of tomatoes can be supported without damaging the support. It can also be used for beans, cucumbers, squash, certain varieties of grapes, certain dwarf fruit trees, blueberry and all fruity vines such as raspberry and blackberry. The posts stay in the ground better and are capable of withstanding high winds. Of course, the advantage of having tomatoes grow above ground means that there can be 20 to 25 percent more tomatoes. As also noted above, the invention is relatively inexpensive, easy to assemble and disassemble and store and is quite versatile since the rings can be straight wire and can be various sizes of rings and various combinations of sizes of rings on a common post.

While I have shown and described the preferred embodiments of this invention, it will be appreciated that various modifications and additions and improvements can be incorporated therein without departing from the spirit and scope of the invention as you find in the appended claims:

What is claimed is:

1. A plant support of the type having a post for driving into the ground and at least one cantilevered plant support wire rod members releasably and lockably supported in cantilever fashion from said post, the improvement comprising, said post being of the type having a U-shaped center portion comprised of a base and a pair of legs with laterally projecting flanges projecting from the legs of said U, and a plurality of hole-slot pairs in said base of said U-shaped center portion and along the length thereof, each said plant wire rod member having integrally formed on the ends thereof a brace member for engaging said pair of flanges on said post, and a clip of resilient material having shape memory, said clip having a central portion and a pair of prong members, one prong member attached to each end of said central portion, said clip releasably and lockably engaging said brace member against said laterally spaced projecting flange members, and said central portion including a pair of hooks, one hook on each said prongs, for engaging the base portion of said post member through said hold-slot pairs.

2. The invention defined in claim 1 wherein said central portion comprises a U-shaped member secured to said brace means, said U-shaped member having a said pair of outwardly projecting prongs formed integral therewith, one of said prongs constituting a detent for lockingly engaging with one of said hole-slot pairs.

3. The invention defined in claim 2 wherein said detent is constituted by a projection on one of said prongs having a shoulder constituting one of said hooks, said projection being of a length to be engagable by a finger to release said one of said hooks from said post for disassembly of said plant support.

4. The invention defined in claim 1 wherein said central portion comprises a U-shaped wire rod member secured to said brace means, said pair of prong members being vertically oriented and the lower one thereof having the hook thereof formed as an arm engagable with the portion of said post bounding the slot of said hole-slot pair to cam said arm upwardly until the hook on said lower prong is engaged.

* * * * *